(12) United States Patent
Toillon et al.

(10) Patent No.: US 10,027,509 B2
(45) Date of Patent: Jul. 17, 2018

(54) BRIDGE-BASED DATA TRANSMISSION ARCHITECTURE, IN PARTICULAR FOR USE IN ON-BOARD AVIONICS

(71) Applicant: THALES, Courbevoie (FR)

(72) Inventors: Patrice Toillon, Meudon la Foret (FR); Augustin Mignot, Meudon la Foret (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/826,571

(22) Filed: Aug. 14, 2015

(65) Prior Publication Data

US 2015/0358179 A1 Dec. 10, 2015

Related U.S. Application Data

(63) Continuation of application No. PCT/EP2014/052484, filed on Feb. 7, 2014.

(30) Foreign Application Priority Data

Feb. 15, 2013 (FR) .................................... 13 00339

(51) Int. Cl.
*H04L 12/46* (2006.01)
*H04L 12/44* (2006.01)
(Continued)

(52) U.S. Cl.
CPC .............. *H04L 12/46* (2013.01); *B64D 43/00* (2013.01); *H04L 12/42* (2013.01); *H04L 12/44* (2013.01); *H04L 12/4637* (2013.01)

(58) Field of Classification Search
CPC .................................................. H04L 12/4637
See application file for complete search history.

(56) References Cited

U.S. PATENT DOCUMENTS 8,179,787 B2   5/2012  Knapp
8,705,527 B1 * 4/2014  Addepalli ............. H04W 4/046
                                                    370/389

(Continued)

FOREIGN PATENT DOCUMENTS

EP         2182679 A1    5/2010
WO    WO 2013/002855 A1   1/2013

OTHER PUBLICATIONS

Search Report dated Nov. 4, 2013 for French Patent Application No. 1300339 filed on Feb. 15, 2013.

(Continued)

*Primary Examiner* — Parth Patel
(74) *Attorney, Agent, or Firm* — Knobbe, Martens, Olson & Bear, LLP

(57) ABSTRACT

A data transmission architecture, in particular for use in on-board avionics is disclosed. The data transmission architecture includes at least one main data transmission network with integrated functional nodes for connecting a plurality of peripheral data transmission networks to the main network, in order to provide data transmission between the networks. The data transmission architecture also includes a direct connection of peripheral networks to one another so as to allow the transmission of data directly between the peripheral networks without passing through the main network. The main network includes a plurality of associated subnetworks.

11 Claims, 2 Drawing Sheets

(51) Int. Cl.
*H04L 12/42* (2006.01)
*B64D 43/00* (2006.01)

(56) References Cited

U.S. PATENT DOCUMENTS

| | | | |
|---|---|---|---|
| 2002/0131409 A1* | 9/2002 | Frank | H04L 12/437 370/386 |
| 2003/0008611 A1* | 1/2003 | Forman | H04B 7/18508 455/3.01 |
| 2004/0208554 A1 | 10/2004 | Wakai et al. | |
| 2006/0092856 A1 | 5/2006 | Mitsumori | |
| 2008/0170495 A1* | 7/2008 | Monse | G05B 19/0428 370/223 |
| 2008/0170857 A1 | 7/2008 | Bardalai | |
| 2008/0316918 A1 | 12/2008 | Sakauchi | |
| 2010/0111092 A1* | 5/2010 | Jiang | H04L 12/42 370/400 |
| 2011/0116508 A1 | 5/2011 | Kirrmann | |
| 2011/0252090 A1 | 10/2011 | Garcia, Jr. et al. | |
| 2012/0230335 A1 | 9/2012 | Filsfils et al. | |
| 2012/0250695 A1 | 10/2012 | Jia et al. | |
| 2013/0170337 A1 | 7/2013 | Vallala et al. | |
| 2014/0185427 A1* | 7/2014 | Ditzel, III | H04L 12/437 370/223 |
| 2015/0016259 A1* | 1/2015 | Toillon | H04L 12/437 370/235 |
| 2015/0358178 A1* | 12/2015 | Toillon | H04L 12/4637 370/258 |
| 2016/0142172 A1 | 5/2016 | Strasser et al. | |

OTHER PUBLICATIONS

Search Report dated Nov. 4, 2013 for French Patent Application No. 1300338 filed on Feb. 15, 2013.
U.S. Publication No. 2015/0358178 A1, published Dec. 10, 2015, for U.S. Appl. No. 14/026,532, which is related to subject U.S. Appl. No. 14/826,571.
U.S. Office Action dated Feb. 24, 2017 for U.S. Appl. No. 14/826,532, which is related to subject U.S. Appl. No. 14/826,571.
Reply submitted May 24, 2017 to U.S. Office Action dated Feb. 24, 2017 for U.S. Appl. No. 14/826,532, which is related to subject U.S. Appl. No. 14/826,571.
U.S. Office Action dated Sep. 13, 2017 for U.S. Appl. No. 14/826,532, which is related to subject U.S. Appl. No. 14/826,571.
U.S. Office Action dated Apr. 16, 2018 for U.S. Appl. No. 14/826,532, filed Aug. 14, 2015.

* cited by examiner

This application is a continuation of International Application No. PCT/EP2014/052484, filed Feb. 7, 2014, which claims benefit under 35 U.S.C. § 119 of French Application No. 13 00339, filed Feb. 15, 2013, which are herein incorporated by reference in their entirety.

BACKGROUND

Technological Field

The described technology generally relates to a data transmission architecture. More specifically, the described technology relates to such a data transmission architecture in particular designed for applications to on-board avionics.

Description of the Related Technology

In such applications, in particular to on-board avionics, the equipment is generally distributed into groups to form systems or subsystems.

It is known that the data communication and transmission architectures that were developed in the related technology make it possible, owing to the association of different network topologies, each of which has its own communication mode, to respond optimally to communication needs of the systems.

In particular, these architectures make it possible to provide a response certifying their data exchanges and the interconnections, while maintaining the integrity and availability levels required for each of the systems.

Thus, for example, it is known that in the related technology, there are different data transmission networks, implementing different protocols and that are connected to one another by exchange gateways.

SUMMARY OF CERTAIN INVENTIVE ASPECTS

One objective of the described technology is to further improve this type of transmission architecture.

To that end, one inventive aspect relates to a data transmission architecture, in particular for use in on-board avionics, including at least one main data transmission network with integrated functional nodes for connecting at least two peripheral data transmission networks to the main network, in order to provide data transmission between the networks, and a capability for the direct connection of peripheral networks to one another so as to allow the transmission of data directly between the peripheral networks without passing through the main network.

Other aspects of the architecture can include, considered alone or in combination:
- the main network and/or the peripheral data transmission networks include redundant data transmission supports;
- the main network and/or the peripheral data transmission networks include switches;
- the main network and/or the peripheral data transmission networks are looped networks;
- the main network and/or the peripheral data transmission networks are star networks;
- at least one peripheral data transmission network assumes the form of a looped network for the unconditional transmission of messages from node to node, independently of those messages;
- at least one peripheral data transmission network assumes the form of a looped network for the conditional transmission of messages from node to node, dependent on those messages;
- at least some of the data transmission networks are unidirectional;
- at least some of the data transmission networks are bidirectional;
- the functional nodes connecting networks comprise an extraction/injection/monitoring capability for frames of and in the networks;
- the main network includes several associated sub-networks;
- at least some of the functional nodes are programmable;
- the frame extraction/injection/monitoring capability of the programmable node uses a programming database stored in a corresponding storage capability;
- the main network and the peripheral data transmission networks include data transmission supports that are completely or partially redundant associated by redundancy plane.

BRIEF DESCRIPTION OF THE DRAWINGS

The described technology will be better understood using the following description, provided solely as an example and done in reference to the appended drawings, in which.

DETAILED DESCRIPTION OF CERTAIN INVENTIVE EMBODIMENTS

Figure 1:
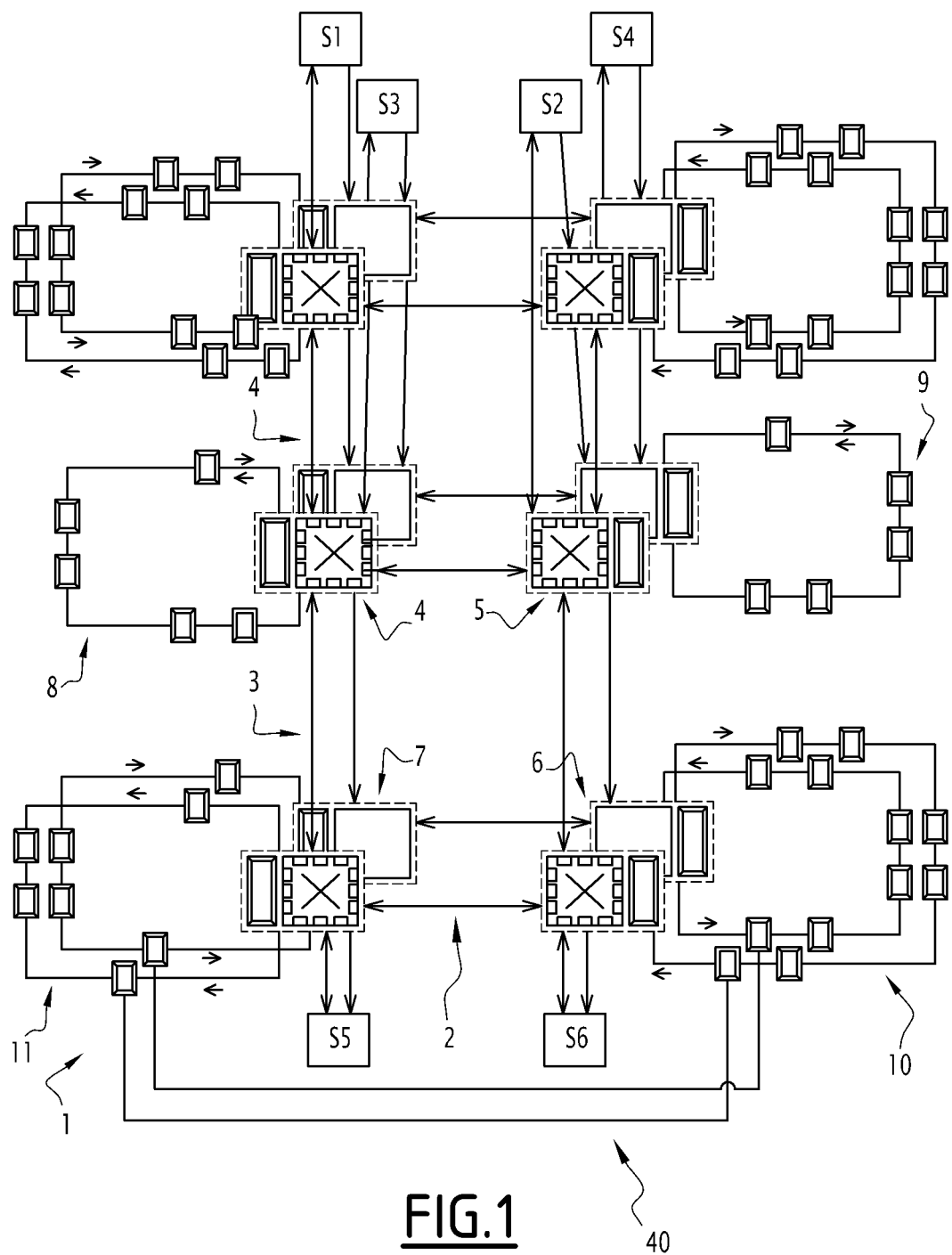
FIG. 1 shows an example embodiment of a data transmission architecture in particular for an on-board avionics application, according to the described technology.

These figures, and in particular FIG. 1, in fact show a data transmission architecture in particular for on-board avionics applications.

This architecture is designated by reference 1 in this figure and then for example includes at least one main data transmission network, for example designated by general reference 2, in which functional nodes are integrated for connecting peripheral data transmission nodes, to that main network, in order to ensure a data transmission between those networks.

Thus for example, the main network and/or the peripheral data transmission networks can be looped or star networks.

In the example illustrated in this FIG. 1, the main data transmission network includes looped networks or sub-networks, for example like those designated by reference 3.

This main network 3 then includes functional nodes for example designated by references 4, 5, 6 and 7, for connecting peripheral networks for example in a data transmission loop, to that main network 2.

The data transmission peripheral networks are respectively designated by references 8, 9, 10 and 11 in that FIG. 1.

In fact and as illustrated, the main network and/or the peripheral data transmission networks may include redundant data transmission supports associated by redundancy plane.

The main data transmission network 2 may include switches making it possible to transmit data therein.

At least one peripheral network may also include such switches.

At least one of the peripheral data transmission networks may also assume the form of a looped network for the unconditional transmission of messages from node to node in the network, that transmission being independent of those messages.

However, for example, other peripheral data transmission networks may of course also assume the form of looped networks for the conditional transmission of messages from node to node in that network, that transmission then being dependent on those messages.

Likewise, at least some of the data transmission networks can be unidirectional or bidirectional, the information traveling in one direction or both directions in the network.

One can then see that owing to such a structure, the peripheral communication networks are autonomous relative to one another, the main network seeing to the federation of those various networks and therefore of the different corresponding domains, with respect to the information exchanged between them.

The main or central communication network may be based on a communication technology based on frame switching, using one or more pieces of dedicated avionics equipment of the switch, for example, also referred to as switches, or avionics subsystems of the distributed switch type.

This essential communication network or domain may for example be based on standards of the Aeronautical Radio, Incorporated (ARINC) 664 or ETHERNET Institute of Electrical and Electronics Engineers (IEEE) 802.3 type.

Figure 2:
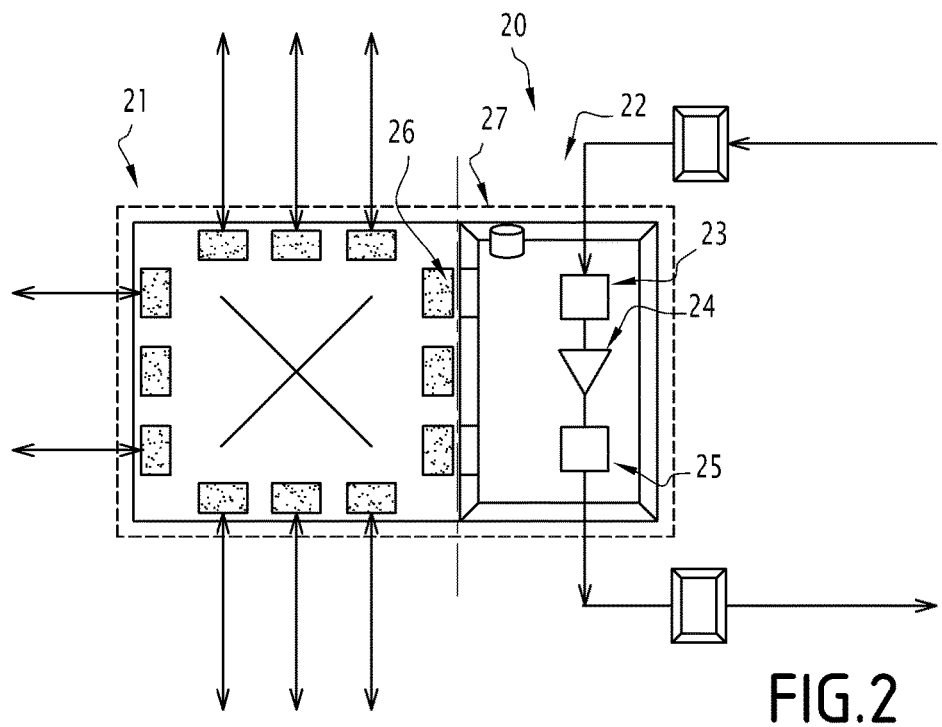
FIGS. 2 and 3 show example embodiments of functional nodes connected in such networks.
Figure 3:
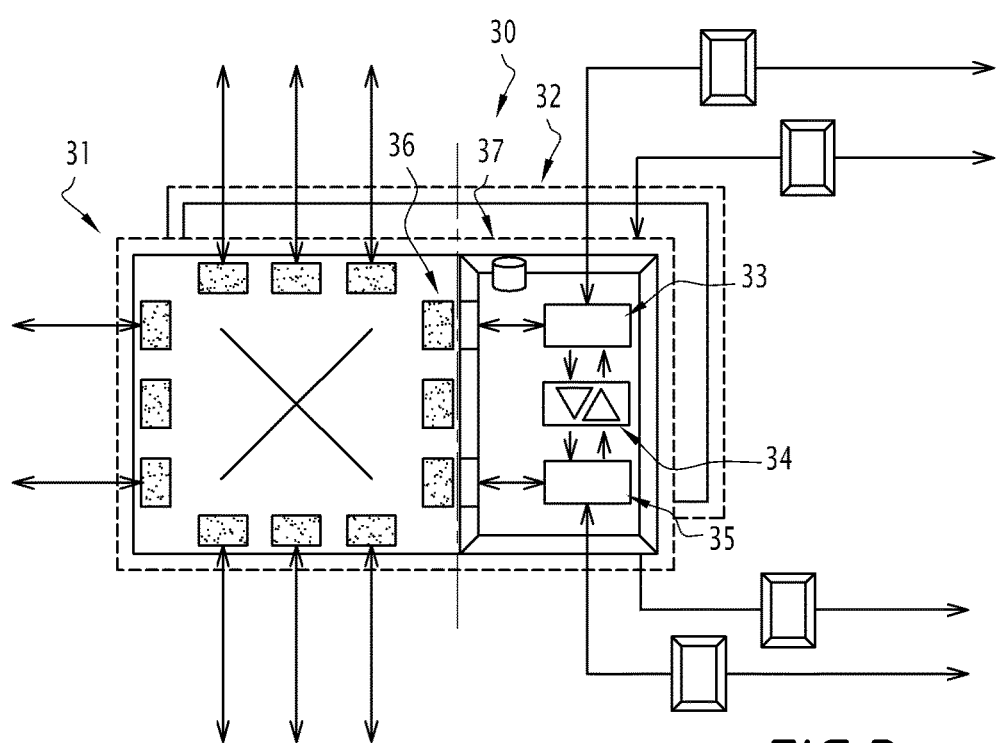

Furthermore and as illustrated for example in FIGS. 2 and 3, the functional nodes of the peripheral networks connected to the main network may comprise a frame extracting/injecting/monitoring capability, to or from the main data transmission network.

These FIGS. 2 and 3 indeed illustrate nodes 20 and 30, respectively, whereof the node 20 is a node for a simple transmission loop, while the node 30 is a node for a double data transmission loop.

It is thus for example possible to show that the main network and the peripheral data transmission networks may each include data transmission supports that are completely or partially redundant, which are then associated by redundancy plane.

Indeed and as illustrated, each node includes a switching part 21 and 31, respectively, for connecting to the main network, and a part including extracting/injecting/monitoring capabilities for frames 22 and 32, respectively.

These parts for example include, for each data transmission loop and therefore each plane, frame extraction capabilities 23 and 33, respectively, for the circulation capabilities 24, 34, respectively, and frame injection capabilities 25, 35, respectively.

Monitoring capabilities 26, 36, respectively, are provided between the two parts of the nodes.

Of course, at least some of the connecting nodes may be programmable and these frame extracting/injecting/monitoring capabilities of the programmable node then use a programming database stored in corresponding storage capability, for example an integrated configuration database designated by references 27 and 37, respectively, in these FIGS. 2 and 3.

One can of course see that each configuration table can be modified based on the logic connectivity of the data flows to be exchanged between a peripheral domain or network and the main domain or network.

As also illustrated in FIG. 3, in the case of a peripheral domain with a multi-plane architectures for example with two loops as illustrated, i.e., for example loops called loops α and β, each loop, i.e., each plane is connected to one of the redundant switches, i.e., the loop α is associated with one switch and the loop β is associated with another switch.

This assembly then makes up a redundant overall system with a direct connection from end to end.

Furthermore and in order to still further improve the operation, strength and reliability of such an architecture, at least two peripheral networks connected to the main network can be connected directly to one another so as to allow the data transmission directly between those peripheral networks and without going through the main network.

This is, for example, illustrated by the connections or direct connecting bridges designated by general reference 40 in FIG. 1, between the peripheral networks 10 and 11, and more particularly functional connecting nodes thereof.

These connections or bridges are, in the illustrated example, direct connecting bridges of these peripheral networks, for example by redundancy plane.

They then allow a direct data transmission between the peripheral networks without going through the main network.

Of course, other embodiments may also be considered.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A data transmission architecture for use in on-board avionics, comprising:
   at least one main data transmission network with integrated functional nodes for connecting a plurality of peripheral data transmission networks to the main network, in order to provide data transmission between the networks; and
   a direct connection of the peripheral data transmission networks to one another so as to transmit data directly between the peripheral data transmission networks without passing through the main network, each of the peripheral data transmission networks being directly connected to the same main network,
   wherein the main network includes a plurality of associated sub-networks,
   wherein the main network is a looped network, and
   wherein the main network and the peripheral data transmission networks include redundant data transmission supports forming at least two redundancy planes, the data transmission supports of different redundancy planes being completely redundant and independent from one another.

2. The data transmission architecture according to claim 1, wherein the main network and/or the peripheral data transmission networks include switches.

3. The data transmission architecture according claim 1, wherein the peripheral data transmission networks are looped networks.

4. The data transmission architecture according to claim 1, wherein the peripheral data transmission networks are star networks.

5. The data transmission architecture according to claim 1, wherein at least one peripheral data transmission network assumes the form of a looped network for the unconditional transmission of messages from node to node, independently of those messages.

6. The data transmission architecture according to claim 1, wherein at least one peripheral data transmission network assumes the form of a looped network for the conditional transmission of messages from node to node, dependent on those messages.

7. The data transmission architecture according to claim 1, wherein at least some of the data transmission networks are unidirectional.

8. The data transmission architecture according to claim 1, wherein at least some of the data transmission networks are bidirectional.

9. The data transmission architecture according to claim 1, wherein the functional connecting nodes comprise an extraction/injection/monitoring capability for frames of and in the networks.

10. The data transmission architecture according to claim 9, wherein at least some of the functional nodes are programmable and wherein the frame extraction/injection/monitoring capability of the programmable node uses a programming database stored in a corresponding storage capability.

11. The data transmission architecture according to claim 1, wherein at least some of the functional nodes are programmable.

* * * * *